United States Patent
Xi et al.

(10) Patent No.: US 10,634,126 B2
(45) Date of Patent: Apr. 28, 2020

(54) CONSTANT-VOLUME METERING PUMP

(71) Applicant: Zhejiang FAI Electronics Co., Ltd., Hangzhou (CN)

(72) Inventors: Daguang Xi, Hangzhou (CN); Ping Zhang, Hangzhou (CN); Qijiang Le, Hangzhou (CN); Luming Xu, Hangzhou (CN); Yanxiang Yang, Hangzhou (CN)

(73) Assignee: Zhejiang FAI Electronics Co., Ltd., Hangzhou, Zhejiang (CN)

( * ) Notice: Subject to any disclaimer, the term of this patent is extended or adjusted under 35 U.S.C. 154(b) by 89 days.

(21) Appl. No.: 15/782,831

(22) Filed: Oct. 12, 2017

(65) Prior Publication Data
US 2019/0113029 A1 Apr. 18, 2019

(51) Int. Cl.
| | |
|---|---|
| F04B 19/22 | (2006.01) |
| F04B 17/04 | (2006.01) |
| B01F 15/04 | (2006.01) |
| F01N 3/20 | (2006.01) |
| F01N 3/025 | (2006.01) |
| F01N 9/00 | (2006.01) |

(52) U.S. Cl.
CPC .......... *F04B 19/22* (2013.01); *B01F 15/0454* (2013.01); *F01N 3/0253* (2013.01); *F01N 3/208* (2013.01); *F01N 9/00* (2013.01); *F04B 17/042* (2013.01); *F01N 2610/02* (2013.01); *F01N 2610/03* (2013.01); *F01N 2610/1433* (2013.01)

(58) Field of Classification Search
CPC ..... F01N 2610/1433; F01N 2610/1453; F04B 7/0076; F04B 7/04; F04B 9/025; F04B 19/22; F04B 39/0016; F04B 39/1006; F04B 53/101; F04B 53/1005; F04B 53/1085; F04B 53/126
See application file for complete search history.

(56) References Cited

FOREIGN PATENT DOCUMENTS

WO   WO-2016041339 A1 * 3/2016 ........... F01N 3/2066

OTHER PUBLICATIONS

Machine translation of WO-2016041339-A1, accessed Jun. 7, 2019. (Year: 2019).*

* cited by examiner

*Primary Examiner* — Jonathan R Matthias
(74) *Attorney, Agent, or Firm* — Liang Legal Group, PLLC

(57) ABSTRACT

A constant-volume metering pump includes a pump body, a solenoid device, and a piston pump inside the pump body. The solenoid device includes an armature, and the piston pump includes a sleeve, a piston, an inlet valve, and an outlet valve. The sleeve includes an inner sleeve bore. The inner sleeve bore conforms with the external surface of the piston and can slide freely. The piston pump divides the interior pump body into a low-pressure space and a pressure feed space. Liquid enters the pressure feed space from the low pressure space through the inlet valve and is output through the outlet valve, wherein the sleeve connects with the armature and keeps synchronous reciprocating motions. The solenoid-driven device drives the sleeve to perform a motion relative to the piston, causing output of liquid. The output quantity of liquid due to such relative motion is defined by the geometric construction.

20 Claims, 11 Drawing Sheets

CONSTANT-VOLUME METERING PUMP

FIELD OF THE INVENTION

The present invention relates to a technical field of liquid measurement, particularly to a liquid injection measurement technique related to the after-treatment of engine exhaust. Specifically, it relates to a nitrogen oxide selective catalytic reduction (SCR) system for engine exhaust purification, and a fuel injection regeneration system for diesel engine exhaust particulate filtration and collection (DPF).

BACKGROUND

The nitrogen oxide selective catalytic reduction (SCR) system for engine exhaust purification and the diesel particulate filter (DPF) system are not only of great importance to diesel engines, but also have application value for gasoline direct injection engines. Both relate to the liquid injection and measurement.

In a nitrogen oxide selective catalytic reduction (SCR) system, it is necessary to quantitatively inject 32.5% urea solution into the engine exhaust system. At a high temperature, the urea solution is decomposed into ammonia gas, which reacts, in the presence of a SCR catalyst, with nitrogen oxide in the exhaust gas to produce nitrogen gas and water, thereby reducing emission.

In a diesel particulate filter (DPF) system, a ceramic or metal carrier is used to filter the soot to prevent it from being discharged into the air. However, as the soot particulates accumulate in the filtration carrier, the engine exhaust back pressure rises continuously. At this time, it is necessary to inject fuel into the exhaust system to increase the discharge temperature and burn up the accumulated soot, thereby achieving regeneration of the diesel particulate filter (DPF).

The above processes have strict requirements for the precision of the liquid injection amount. For SCR system, injection of too little NOX reducing agent (i.e. urea solution) will not lead to reduction of some nitrogen oxides, and injection of too much reducing agent will cause secondary pollution as well as waste. For DPF regeneration system, insufficient fuel injection may cause inability to complete regeneration, and excessive fuel injection may lead to a too high temperature, and burn up the DPF filtration carrier. Therefore, for the above applications, accurate injection and measurement is very important.

In prior arts, there are two primary technical routes of injections and measurements. One route is as follows: a liquid feed pump system provides a constant pressure, and the injection amount is measured on the basis of the opening duration of an electromagnetic nozzle, such as the common rail system of gasoline and diesel, and the DENOXTRONIC 2.2 sold by BOSCH and other urea injection systems. The other route is by adopting a piston pump metering device that is driven by a solenoid device, and the injection amount of each pulse is measured on the basis of the displacement of a piston.

For the latter, U.S. Patent No.: US20150082775A discloses a metering device that is a solenoid-driven piston pump, wherein the piston sleeve is fixed with the solenoid, and the piston is fixed on an armature and reciprocates along a fixed stroke in a T-shaped space. The injection amount of a single pulse is determined by the motion stroke of the piston. The disadvantage of such a metering device is that the piston connects with the armature end to end, the axial dimension is relatively long, and the moving mass is relatively large. Therefore, if friction pairs completely rely on piston-sleeve coordination, then the center of gravity of the moving parts will be outside the support friction pairs, and the movement inertia will affect the durability. If a slide support (i.e. the MAGNET SLEEVE 67) of the piston or of the armature is arranged on the other end of the spring opposite to the sleeve, then it is necessary to control the co-axiality of the sleeve and the slide support. However, it is difficult to make such structure particularly to arrange an extra snap ring (snap ring 68) between the slide support of the piston and the spring, because it is complicated to install a snap ring. In addition, as the mass and friction force of the moving part are relatively large, the frequency of reciprocating motion of the piston will be restricted.

SUMMARY

To solve the above problems, an objective of the present invention is to provide a reasonably structured solenoid-driven sleeve-piston pump device with moving parts whose mass is small (light) and friction force is low, so as to improve working frequency, repeat precision, and durability.

In addition, a pump unit provided in the present invention ensures a single pulse output quantity by way of geometric design, and further improves the pump flow control precision.

A constant-volume metering pump, including a pump body, and a solenoid device and a piston pump disposed inside the pump body, wherein the solenoid device includes an armature, and the piston pump includes a sleeve, a piston, an inlet valve, and an outlet valve, wherein the sleeve includes an inner sleeve bore, which closely coordinates with (matches) the external surface of the piston, and can slide freely. The piston pump divides the interior pump body into low-pressure space and pressure feed space. Liquid enters the pressure feed space from the low-pressure space through the inlet valve, and is output through the outlet valve, which is characterized in that, the sleeve connects with the armature and keeps synchronous reciprocating motion, the solenoid-driven device drives the sleeve to perform a motion relative to the piston, causing output of liquid, and the output quantity of liquid formed due to such relative motion is defined by the geometric construction. The constant-volume metering pump can change the output quantity of liquid per unit time by changing the frequency of the reciprocating motion.

The solenoid device mentioned in the above embodiment has a structure that meets the fundamental principle of producing electromagnetic driving force—i.e., a good permeability magnetic material (i.e., a magnet yoke) is arranged around the solenoid coil, wherein the magnet yoke, which is arranged in the inner bore of the solenoid coil, is an inner yoke. The inner yoke is divided into a lower inner yoke and an upper inner yoke by a magnetic diaphragm ring with a low magnetic permeability. The upper inner yoke, the lower inner yoke, and the magnetic diaphragm ring form a roughly cylindrical space (i.e., an armature chamber) for the armature to reciprocate. The outer contour of the armature is roughly a column (a pillar), the front end face of which is located near the magnetic diaphragm ring. When the coil is energized, the armature moves towards the lower magnet yoke under the action of the electromagnetic field force; when the coil is deenergized, it returns towards the upper magnet yoke under the action of the return spring force, thereby forming the reciprocating motion of the armature.

In the above embodiment, the sleeve and the armature are mutually locked and form synchronous movement. Such synchronous movement can be achieved through structures including, but not limited to, the following. The first structure: the sleeve and the armature are independent structures and are arranged coaxially and connected end to end. The armature drives the sleeve to move towards the lower magnet yoke, and the spring force drives the sleeve and the armature to move towards the upper magnet yoke. The second structure: the sleeve and the armature are independent structures and the sleeve is embedded in the center of the armature. They can be fixed by tight fit, or be fixed by welding or through threads. They can urge against each other by spring force. The third structure: the armature and the sleeve form an integral part. All geometric elements that function as the sleeve are formed by machining the armature.

The piston mentioned in the above embodiment may be roughly a cylinder containing a center bore. The piston, the magnet yoke, and the solenoid coil are all fixed on the pump body. The sleeve includes an inner sleeve bore, which closely matches the piston, and can slide freely.

The armature is arranged in a low-pressure space, and is provided with an axial straight slot for reducing the resistance to reciprocating motion.

When the sleeve moves forward along with the armature, or within a certain stroke, the inlet valve is closed thereupon, and the liquid pressure in the pressure feed space begins to rise. After such pressure becomes greater than the opening pressure for the outlet valve, the outlet valve is opened and outputs liquid. During the return stroke, under the action of the return spring force, the armature and the sleeve move backwards, and the inlet valve starts to open thereupon or after a certain stroke, the liquid in the low pressure space enters the pressure feed space, waiting for the next injection cycle.

For the above metering pump structure, if the output quantity of liquid of each pulse is predicted based on the electromagnetic force provided by the solenoid device, then it will certainly be affected by materials, power supplies, medium viscosity, electromagnetic properties, and frictional resistance, and it cannot ensure an output of high precision. For this reason, the high-precision outputs in embodiments of the invention are achieved through geometric design.

In accordance with one design, a front pump end and a rear pump end are relatively fixed to the pump body, and the armature moves between the front pump end and the rear pump end. The front pump end can be arranged on the lower inner yoke and formed by machining as an integral part.

In the other design, the sleeve includes a discharge hole to limit the quantity of output liquid. A specific design may include a ring slot that connects with the center bore of the piston. When the sleeve discharge hole overlaps with the ring slot, the liquid in the pressure feed chamber will be discharged/decompressed, and the pressure feed stroke will end. Similarly, the ring slot can also be arranged in the inner sleeve bore.

The geometric designs for defining the single pulse output quantity are not limited to the above examples. Any design for defining/limiting the outputs, either by limiting through armature displacement or by decompression, falls within the scope of this invention. To achieve the objective of constant volume measurements as limited/defined by geometric designs mentioned above, the solenoid device should be capable of providing a driving force that can surpass the defined displacement.

The inlet valves mentioned in the above embodiments can be realized through various designs.

An inlet valve may include an inlet valve piece and an inlet valve seat, wherein the inlet valve seat is arranged on the other end of the inner sleeve bore opposite to the piston. The inlet valve piece can be a flat plate, or a sphere, or a cone; and the inlet valve seat can be a plane, or a conical surface, or a spherical surface. The inlet valve seat may be made of a material different from that of the sleeve or the armature, and fixed on the sleeve or the armature through welding or other mechanical means, or designed as an integral part of the sleeve.

Furthermore, an inlet valve may include an inlet valve limiting piece, which may be arranged in the inner sleeve bore. The inlet valve piece is confined between the inlet valve seat and the inlet valve limiting piece, and maintains a space so that it can move freely.

In one of the designs, the inlet valve limiting piece is fixed on the sleeve, including an inlet valve spring that functions between the inlet valve piece and the sleeve. In this way, the inlet valve will be normally open without external forces. The inlet valve spring can be replaced with an elastic body connected with the pump body. When the armature gets close to the rear pump end, the elastic body functions between the inlet valve piece and the pump body, allowing the inlet valve in an opening state in the initial stage after the armature begins to move.

In a second design, the inlet valve limiting piece can move freely in the inner sleeve bore. The inlet valve limiting piece includes a limiting piece spring, which functions between the piston and the inlet valve limiting piece. In this way, the inlet valve piece will always be in a free state.

In a third design, the inlet valve limiting piece includes an inlet valve spring, which functions between the piston and the inlet valve piece.

On the basis of the second and the third designs, a support relatively fixed to the pump body is included. When the armature gets close to the rear pump end, the support defines the displacement of the inlet valve piece towards the direction of the rear pump end. The support and the rear pump end may be constructed as an integral piece.

The other inlet valve is a slide valve formed by the coordination of the piston and the sleeve. In one of the designs, the sleeve includes a suction (fluid entry) passage connecting the inner sleeve bore with the low-pressure space. The suction (fluid entry) passage is opened or closed due to the relative motion between the sleeve and the piston, thereby forming the slide valve. In another design, the piston includes a suction (fluid entry) passage connecting piston center bore with the low-pressure space, and the suction (fluid entry) passage is opened or closed due to the relative motion between the sleeve and the piston, thereby forming the slide valve.

Any embodiment including the above-described constant-volume metering pump designs can be used to form an engine after-treatment DPF regeneration injection device, which would include a nozzle connecting with the outlet valve. Fuels for regeneration are injected into the engine exhaust pipe through the nozzle.

Further, the nozzle may be a lift valve that is opened by pressure. Still further, it may include an air-flow passage connecting the constant-volume metering pump with the engine intake tube. The air-flow passage introduces part of the engine air intake into the constant-volume metering pump for cooling the pump body and the nozzle.

Any embodiments including the above-described constant-volume metering pump designs can be used to form an engine after-treatment SCR air-assisted injection device, which may include an air-liquid mixing chamber and a mixing nozzle connecting with the engine exhaust pipe. The air-liquid mixing chamber connects with the output end of the constant-volume metering pump, and the air-liquid mixing chamber connects with a compressed air source. The reducing agent of the SCR is injected into the air-liquid mixing chamber through the outlet valve of the constant-volume metering pump, and is mixed with the compressed air inside the chamber. Then, the mixture is injected into the engine exhaust pipe through the mixing nozzle.

Any embodiments including the above-described constant-volume metering pump designs may be used to form an engine after-treatment SCR non-air-assisted injection device, which may include a liquid nozzle connecting with the output end of the constant-volume metering pump, and a low pressure infusion pump. A low-pressure infusion pump connects with the constant-volume metering pump in series. The liquid nozzle is a lift valve-type nozzle that is opened by pressure. The liquid nozzle injects the reducing agent of the SCR into the engine exhaust pipe.

In one choice, the low pressure infusion pump is a diaphragm pump; and in another choice, the low pressure infusion pump is a piston pump. The piston pump can be a conventional piston pump of piston motion, or a constant-volume metering pump of sleeve motion provided in this solution. For the latter, it can work out of accordance with the constant volume mode through changing the control strategy.

If the piston pump is chosen as the low-pressure infusion pump, the piston pump can be arranged at a position near to the bottom in the SCR reducing agent storage box, and the liquid reducing agent can enter the low pressure infusion pump relying on its gravity.

In the above design solution of the SCR non-air assisted injection device, in order to avoid the liquid reducing agents being left in the constant-volume metering pump and the pipelines, and causing freezing or crystalizing after the injection ends, it is necessary to pump all or part of the liquid reducing agents back to the SCR reducing agent storage box. For this reason, a jet flow vacuum unit is connected in series between the low pressure pump and the constant-volume metering pump. After the after-treatment injection process ends, the jet flow vacuum unit is started, and negative pressure is produced between the jet flow vacuum unit and the constant-volume metering pump through liquid flow, so as to pump back and clean the residual liquid reducing agents in the pipelines or the pump.

Below is the detailed description of the present invention, in combination with the attached drawings and specific embodiments.

DETAILED DESCRIPTION

Figure 1:
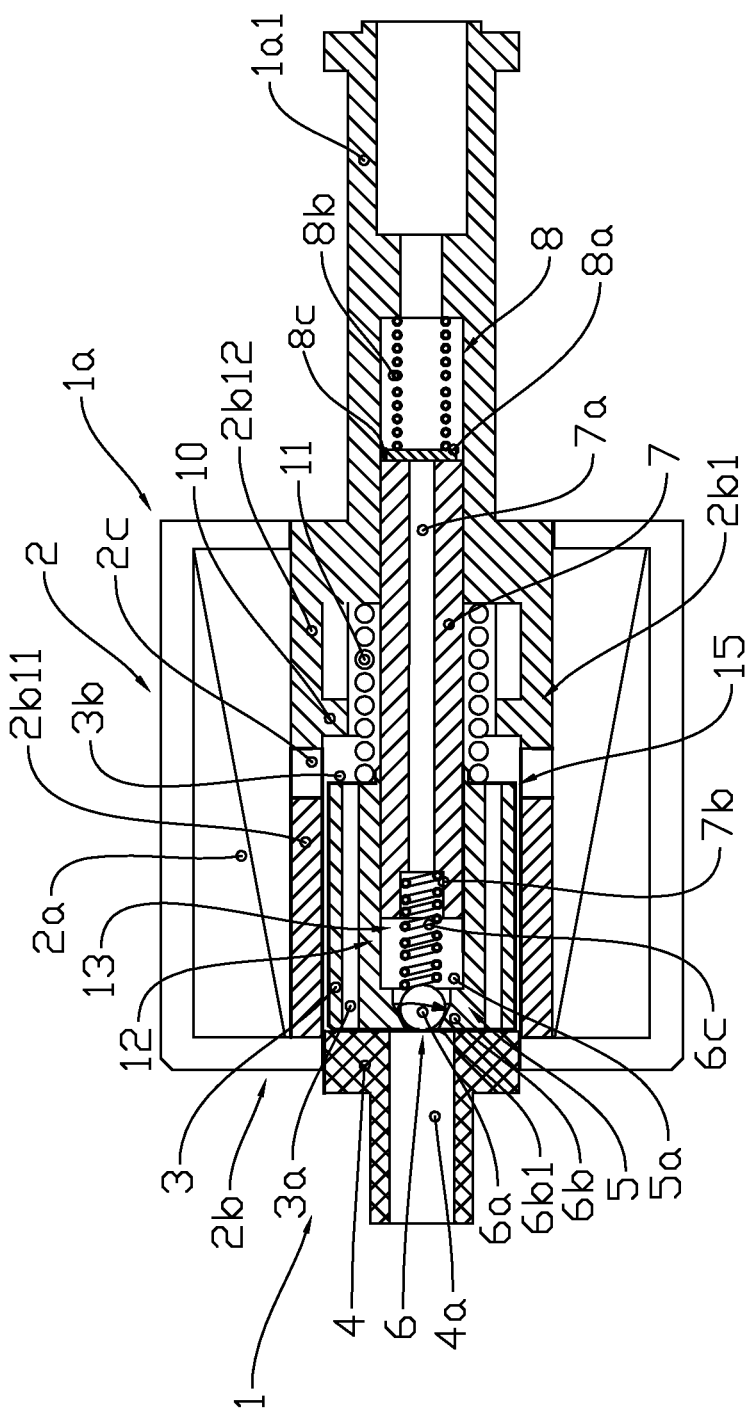
FIG. 1 is a structural representation of the first embodiment of the constant-volume metering pump provided in the present invention.

Referring to FIG. 1, one of the structural representations of the embodiments of the constant-volume metering pump provided in the present invention, the constant-volume metering pump 1 includes a pump body 1a, and a solenoid device 2, a piston pump 12, a rear pump end 4, a front pump end 10 and a reset spring 11 inside the pump body 1a.

The solenoid device 2 has a structure that meets the fundamental principle of producing electromagnetic driving force, including a solenoid coil 2a, a magnet yoke 2b, a magnetic diaphragm ring 2c and an armature 3 driven by electromagnetic forces. The magnet yoke 2b is arranged around the coil 2a, and the magnet yoke 2a located on the inner side of the coil is the inner yoke 2b1, which is divided into an upper inner yoke 2b11 and a lower inner yoke 2b12 by a magnetic diaphragm ring 2c. The upper inner yoke 2b11, the lower inner yoke 2b12 and the magnetic diaphragm ring 2c form a roughly cylindrical space for the armature 3 to reciprocate, i.e. armature chamber 3b. The outer contour of the armature 3 is roughly a cylinder, and its front end face is located near to the magnetic diaphragm ring 2c. When the coil 2a is energized, the armature 3 moves towards the lower magnet yoke 2b12 under the action of the electromagnetic field force; and when the coil 2a is deenergized, it returns towards the upper magnet yoke 2b11 under the action of the spring force of the reset spring 11, thus forming the reciprocating motion of the armature 3. The armature 3 includes an axial straight slot 3a allowing liquid flow, which can reduce the resistance to reciprocating motion. The magnet yoke 2b and the armature 3 are made of permeability magnetic materials, and the magnetic diaphragm ring 2c is made of materials with a low magnetic permeability.

The piston pump 12 includes a sleeve 5, a piston 7, an inlet valve 6 and an outlet valve 8, wherein the sleeve 5 includes an inner sleeve bore 5a, which closely coordinates with the external surface of the piston 7 and can slide freely, and the piston pump 12 divides the interior pump body into pressure feed space 13 and low pressure space 15. The low pressure space 15 connects with the armature chamber 3b, and the pressure feed space 13 consists of a sleeve 5, a piston 7, an inlet valve 6 and an outlet valve 8.

The sleeve 5 is located on the inner side of the armature 3, and integrates with the armature 3, wherein all geometric elements that function as the sleeve 5 are formed by machining the armature 3. The piston 7 is roughly a cylinder containing an axially penetrated center bore 7a, and is fixed on the pump body 1a together with the magnet yoke 2b and the solenoid coil 2a. The inner bore 5a of the sleeve 5 is a through hole, and the piston 7 goes deep into the sleeve from its inner bore 5a end, and closely coordinates with the inner sleeve bore 5a and can freely and relatively slide. The inlet valve 6 connects with the pressure feed space 13 through the sleeve 5, and the outlet valve 8 connects with the pressure feed space 13 through the piston 7. The inlet valve 6 includes an inlet valve piece 6a, an inlet valve seat 6b and an inlet valve spring 6c, wherein the inlet valve seat 6b includes an input end conical surface 6b1 coaxially arranged with the sleeve bore 5a, and the inlet valve piece 6a is a sphere inside the inner sleeve bore 5a. The seal fit between the surface of the sphere and the input end conical surface 6b1 can be achieved. The inlet valve spring 6c is located in the valve spring seat 7b on one end of the piston 7, and the spring force acts on the inlet valve piece 6a, making the inlet valve piece 6a tend to get close to the inlet valve seat 6b. The outlet valve 8 includes an outlet valve seat 8c, an outlet valve piece 8a and an outlet valve spring 8b, wherein the outlet valve piece 8a is a flat plat, and the inlet valve seat 8c is a plane located on the end of the piston 7, and seal fit between the plane 8c and the plane 8a1 of the inlet valve piece 8a can be achieved. The outlet valve 8 is in a closing state under the action of the spring force of the outlet valve spring 8b. When the pressure of liquid in the pressure feed space 13 rises to the preset opening pressure of the outlet valve 8, the outlet valve 8 will be opened.

The rear pump end 4 includes a liquid inlet 4a. The constant-volume metering pump 1 connects with the outside through the liquid inlet 4a. The front pump end 10 can be arranged on the lower inner yoke 2b12, and formed by integrated machining. The armature 3, under the action of the electromagnetic force and the spring force of the reset spring 11, reciprocates between the rear pump end 4 and the front pump end 10 along a fixed stroke, causing the periodic changes in the volume of the pressure feed space 13. Therefore, liquid that flows through the liquid inlet 4a enters the pressure feed space 13 from the low pressure space 15 through the inlet valve 6, and is output through the outlet valve 8. The output quantity of liquid is determined by the stroke S of the armature 3 between the rear pump end 4 and the front pump end 10, and the constant-volume metering pump 1 will change the motion frequency to change the liquid output quantity per unit time.

The working process of the constant-volume metering pump provided in this embodiment is as follows.

In initial state, the armature 3 stays close to the rear pump end 4 under the action of the spring force of the reset spring 11. Under the action of the electromagnetic force of the solenoid, the armature 3 begins to move towards the front pump end 10, and the internal pressure of the pressure feed space 13 rises continuously. When the liquid pressure is greater than the spring force of the outlet valve 8, the outlet valve 8 is opened, and the working liquid is output from the output end 1a1. When the displacement of the armature 3 is limited by the front pump end 10, the pressure feed stroke ends. After the solenoid device 2 is deenergized, the armature 3 begins its return stroke under the action of the spring force of the reset spring 11, and the internal pressure of the pressure feed space 13 is reduced, the outlet valve 8 is closed under the action of the valve spring force. At the same time, the inlet valve 6 is opened due to the pressure difference function. Liquid in the low pressure space 15 rapidly flows into the pressure feed space 13 to supplement due to pressure difference, until the continual motion of the armature 3 is stopped by the rear pump end 4. Then the constant-volume metering pump 1 returns to the initial state, and waits for the next circulation.

Figure 2:
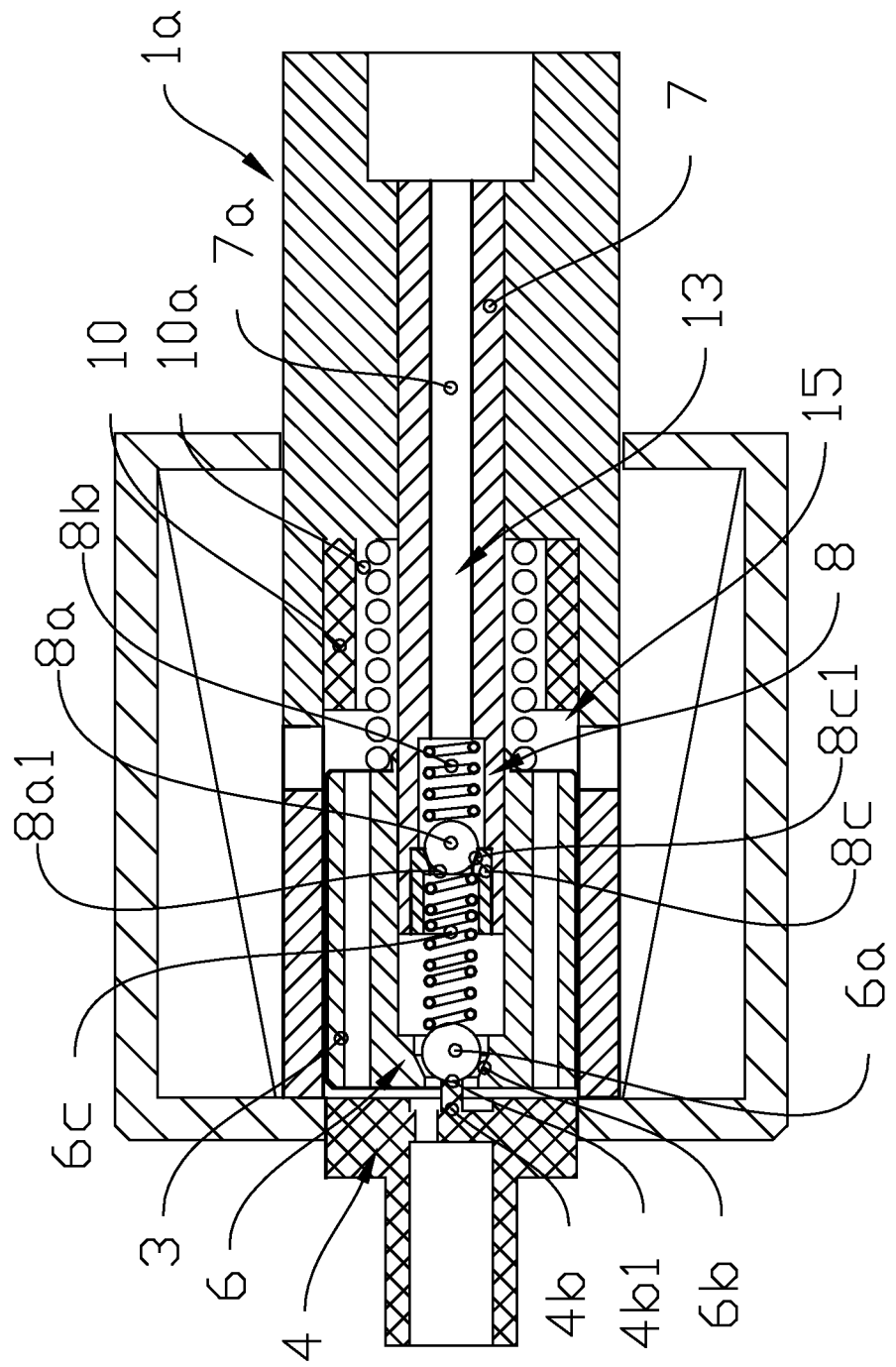
FIG. 2 is a structural representation of the second embodiment of the constant-volume metering pump provided in the present invention.

FIG. 2 is the structural representation of the second embodiment of the constant-volume metering pump provided in the present invention. One of the differences between the schematic diagram of this embodiment and the structure shown for the first embodiment is that, the upper pump end 4 of this structure includes a support 4b with an arc surface 4b1. When the armature 3 gets close to the rear pump end 4, the support 4b will define the inlet valve piece 6a at a distance H away from the inlet valve seat 6b, allowing the valve piece 6a not to fall down to the inlet valve seat 6b, so as to ensure the liquid can smoothly enter the pressure feed space 13, and help discharge gas composition from the pressure feed space 13. The second difference is that, the outlet valve 8 includes an outlet valve seat 8c, an outlet valve piece 8a and an outlet valve spring 8b. The outlet valve piece 8a is a sphere inside the piston center bore 7a, and the outlet valve seat 8c includes a conical surface or spherical surface 8c1 that can be sealed mutually with the surface 8a1 of the valve piece 8a. The outlet valve piece 8a gets close to the outlet valve seat 8c under the action of the spring force of the outlet valve spring 8b, and the outlet valve 8 is in a closing state. When the pressure of liquid in the pressure feed space 13 rises to the preset opening pressure of the outlet valve 8, the valve piece will be opened. The third difference is that, the front pump end 10 is a cylinder containing a center bore 10a, and is fixed on the pump body 1a, and arranged coaxially with the piston 7.

The working process of this embodiment is basically the same as that of the first embodiment. In initial state, the inlet valve piece 6a is unable to take the seat under the action of the support 4b, and the liquid enters the pressure feed space 13 from the low pressure space 15 through the inlet valve 6. When the armature 3 is driven by the electromagnetic force, it begins the pressure feed stroke. In initial stage, the inlet valve 6 is in an opening state, and the resistance to the motion of the armature 3 is small, part of the electromagnetic energy is converted to kinetic energy. When the inlet valve 6 is closed, the pressure of the pressure feed space 13 rapidly rises, and the kinetic energy of the armature 3 is converted to the energy for pressure feed of liquid. When the outlet valve 8 is opened, the liquid in the pressure feed space 13 is injected, and when the armature 3 moves to the front pump end 10, the stroke ends. During return stroke, as the volume of the pressure feed space 13 increases, and the internal pressure reduces, the outlet valve 8 is closed. Under the action of the support 4b, the inlet valve piece 6a leaves the inlet valve seat 6b, and the liquid enters the pressure feed space 13 more rapidly. When the armature 3 stays close to the rear pump end 4, the stroke ends, and this circulation ends.

Figure 3:
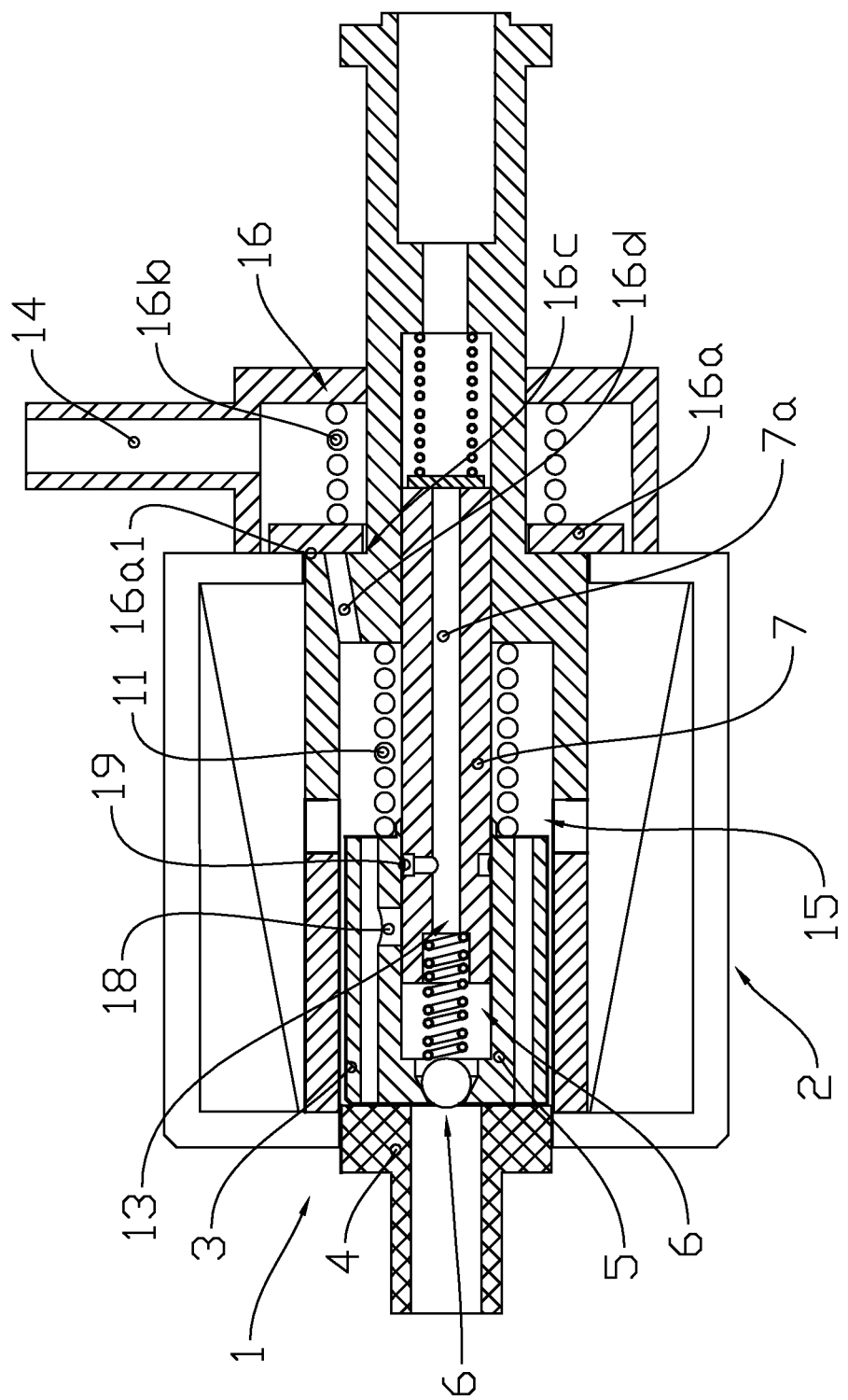
FIG. 3 is a structural representation of the third embodiment of the constant-volume metering pump provided in the present invention.

FIG. 3 is the structural representation of the third embodiment of the constant-volume metering pump provided in the present invention. One of the differences between the schematic diagram of this embodiment and the structure shown for the first embodiment is that, the sleeve 5 includes a discharge hole 18, and the piston 7 includes a ring slot 19 connecting with the center bore 7a. When the sleeve 5 moves until the discharge hole 18 overlaps with the ring slot 19, the liquid in the pressure feed space 13 will be decompressed, and the pressure feed stroke will end. The single pulse output quantity of the constant-volume metering pump 1 is defined by the relative position of the discharge hole 18 to the ring slot 19. The second difference is that, this embodiment includes a return passage 16d connecting with the low pressure space 15, a liquid return nipple 14, a one-way valve 16 connected in series with and on the return passage 14. The one-way valve 16 includes a one-way valve piece 16*a*, a one-way valve spring 16*b* and a one-way valve seat 16*c*. The valve piece 16*a* is a flat plate, and the valve seat 16*c* is a plane 16*a*1 coordinating with the valve piece 16*a*. When there is no extra liquid pressure, the one-way valve 16 is in a closing state under the action of the one-way valve spring 16*b*, to maintain the internal pressure of the low pressure space 15, so as to allow liquid to enter the pressure feed space 13 more efficiently.

The working process of the constant-volume metering pump provided in this embodiment is as follows.

In initial state, the armature 3 relies on the rear pump end 4. After the armature 3 moves under the action of the electromagnetic force, the pressure inside the pressure feed space 13 rises continuously, and the outlet valve 8 is opened, injecting the working liquid. When the armature 3 moves until the discharge hole 18 of the sleeve 5 overlaps with the ring slot 19, the liquid in the pressure feed space 13 will be decompressed, and the pressure feed stroke will end. In this process, the pressure inside the pressure space 15 rises accordingly, and the one-way valve 16 is opened, part of the liquid is discharged through the return passage 16*d* and the liquid return nipple 14, and at the same time, part of the heat produced when the solenoid device 2 works is taken away. When the solenoid is deenergized, the armature 3 begins to perform return motion under the action of the reset spring 11, the discharge hole 18 and the ring slot 19 are staggered, the pressure inside the pressure feed space 13 drops, and then the inlet valve 6 is opened, the liquid in the low pressure space 15 enters the pressure feed space 13 to supplement. When the continual motion displacement of the armature 3 is limited by the rear pump end 4, the return stroke ends, and at the same time, the one-way valve 16 is closed.

Figure 4:
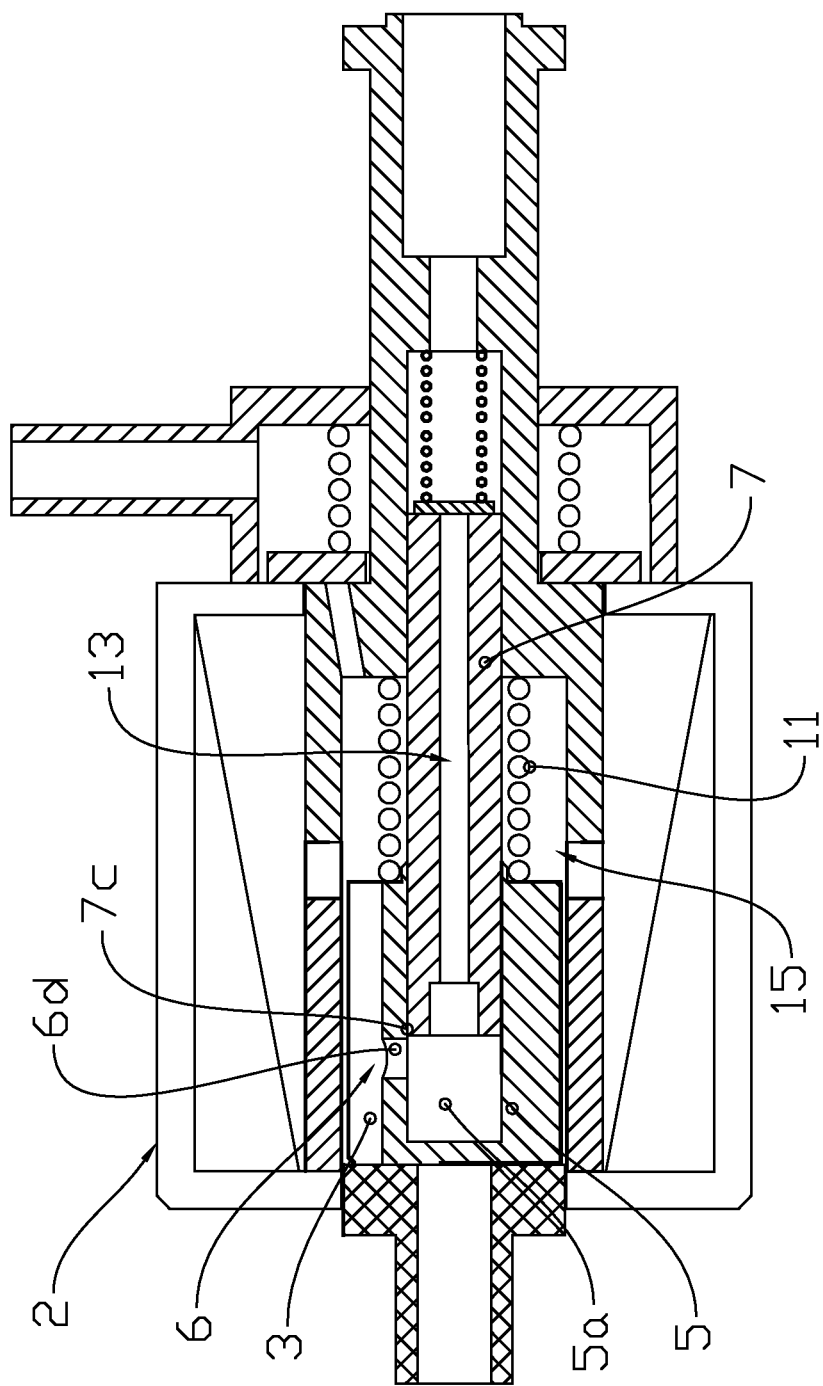
FIG. 4 is a structural representation of the fourth embodiment of the constant-volume metering pump provided in the present invention.

FIG. 4 is the structural representation of the fourth embodiment of the constant-volume metering pump provided in the present invention. The difference between the schematic diagram of this embodiment and the structures described for the first, second and third embodiments is that, the sleeve 5 includes an inner sleeve bore 5*a* with one end closed, and the piston 7 goes deep into the sleeve from the open end of the inner sleeve bore 5*a*. The inlet valve 6 is a slide valve formed by the coordination between the piston 7 and the sleeve 5. The sleeve 5 includes a suction passage 6*d* connecting the inner sleeve bore 5*a* and the low pressure space 15, and the working liquid enters the pressure feed space 13 from the low pressure space 15 through the suction passage 6*d*. When the solenoid device 2 is energized, the armature 3 drives the sleeve 5 to move towards the piston 7, and when the surface 7*c* of the piston 7 covers the suction passage 6*d*, the inlet valve 6 is closed, and the liquid begins to output. When the solenoid device 2 is deenergized, the armature 3 starts the return stroke under the action of the spring force of the reset spring 11, and when the suction passage 6*d* connects with the inner sleeve bore 5*a* again, the inlet valve 6 is opened, and the liquid enters the pressure feed space 13, waiting for the next circulation.

Figure 5:
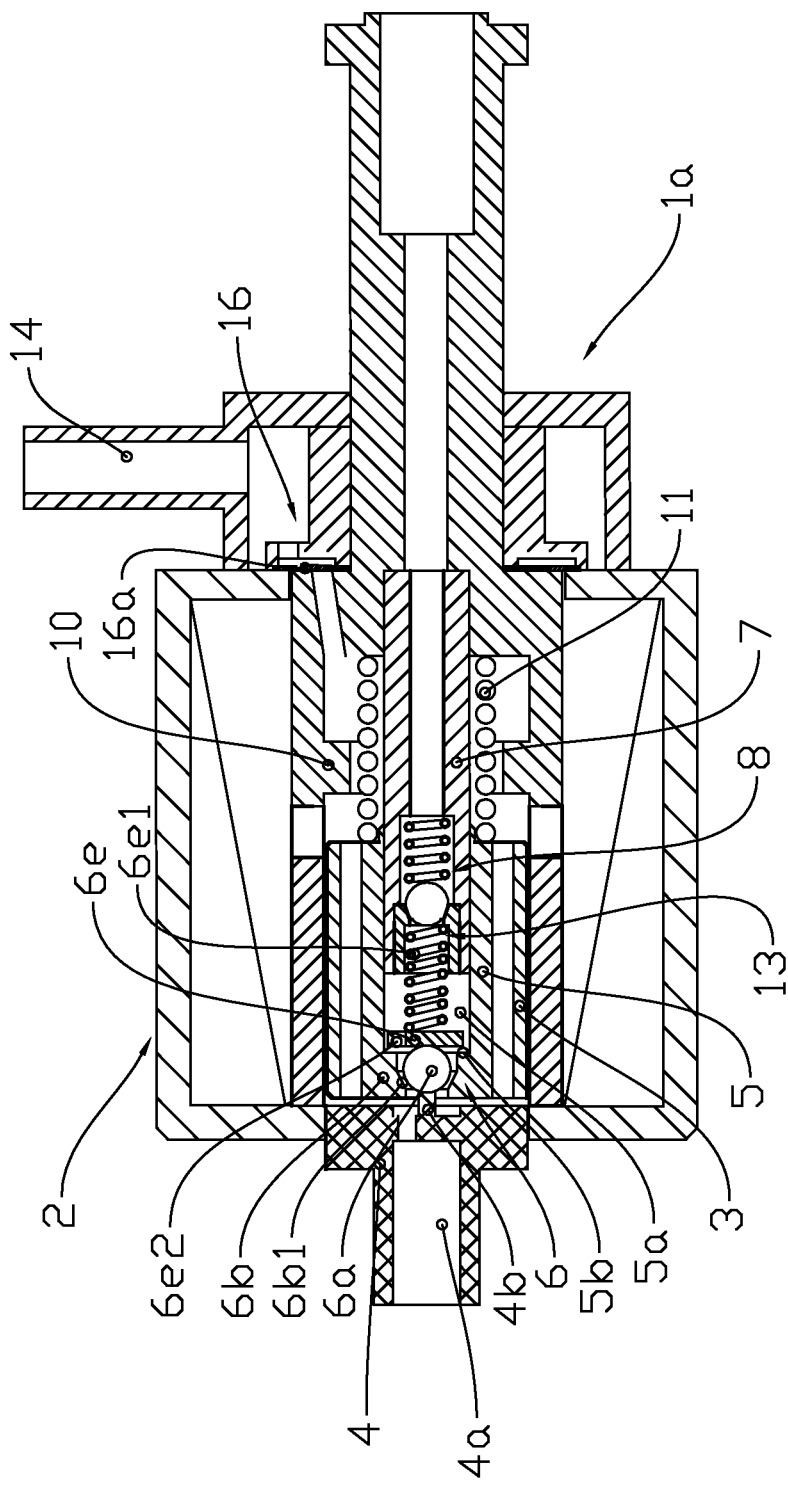
FIG. 5 is a structural representation of the fifth embodiment of the constant-volume metering pump provided in the present invention.

FIG. 5 is the structural representation of the fifth embodiment of the constant-volume metering pump provided in the present invention. One of the differences between the schematic diagram of this embodiment and the previously mentioned structures is that, the inlet valve 6 includes an inlet valve piece 6*a*, an inlet valve seat 6*b*, an inlet valve limiting piece 6*e*, and a limiting piece spring 6*e*1, wherein the inlet valve seat 6*b* includes an input end conical surface 6*b*1 coaxially arranged with the inner sleeve bore 5*a*, and the inlet valve piece 6*a* is a sphere inside the inner sleeve bore 5*a*, seal fit between the surface of the sphere and the input end conical surface 6*b*1 can be achieved. The inlet valve limiting piece 6*e* is arranged coaxially with the inner sleeve bore 5*a*, and can move freely in the inner sleeve bore 5*a*. The limiting piece 6*e* includes a liquid passage 6*e*2 allowing liquid to flow into it, and the limiting piece spring 6*e*1 functions between the piston 7 and the inlet valve limiting piece 6*e*, making the inlet valve limiting piece 6*e* get close to the limiting surface 5*b* of the sleeve 5 under the action of the spring force after the armature 3 leaves its initial position for a distance, and the inlet valve piece 6*a* is in a free state. The second difference is that, the one-way valve 16 is a diaphragm pump, including a diaphragm valve piece 16*a*. When the liquid pressure rises, the diaphragm valve 16 is opened.

The working process of the constant-volume metering pump provided in this embodiment is as follows.

In initial state, the armature 3 stays close to the rear pump end 4 under the action of the spring force of the reset spring 11, and the inlet valve piece 6 is unable to take the seat under the action of the support 4*c*, the low pressure space 15 stays connected to the pressure feed space. When the armature 3 begins to move towards the front pump end 10 under the action of the electromagnetic force of the solenoid, and after a section of stroke, the inlet valve 6 is closed, and the internal pressure of the pressure feed space 13 rises continuously. When the liquid pressure is greater than the spring force of the outlet valve 8, the outlet valve 8 is opened, and the liquid is output. When the displacement of the armature 3 is limited by the front pump end 10, the pressure feed stroke ends. In this process, the pressure inside the low pressure space 15 increases relatively, and the diaphragm pump 16 is opened, part of the liquid flows out through the liquid return passage 16*d* and the liquid nipple 14, and takes away part of the heat produced when the solenoid works. After the solenoid device 2 is deenergized, the armature 3 starts the return stroke under the action of the reset spring force, the one-way valve 16 is closed due to pressure difference function, the internal pressure of the pressure feed space 13 is reduced, and the outlet valve 8 is closed under the action of the valve spring force. As the inlet valve limiting piece 6*e* is blocked by the limiting surface 5*b*, the inlet valve 6 is opened without resistance, and the liquid in the low pressure space 15 rapidly flows into the pressure feed space 13 to supplement due to pressure difference. When the inlet valve piece 6*a* encounters the support 4*b*, the inlet valve 6 is opened more widely, until the armature 3 is blocked by the rear pump end 4, and then the constant-volume metering pump 1 returns to the initial state. Before then, the inlet valve limiting piece 6*e* is jacked up by the inlet valve piece 6*a* and leaves the limiting surface 5*b*, waiting for the next circulation.

In the above return process of the armature 3, as the inlet valve piece 6*a* is in a free state, the inlet valve 6 is opened due to the pressure difference before the inlet valve piece 6*a* takes the seat of the support 4*b*, making part of the working liquid enter the pressure feed space 13 in advance, so as to shorten the liquid supplementation time, and improve the injection precision.

Figure 6:
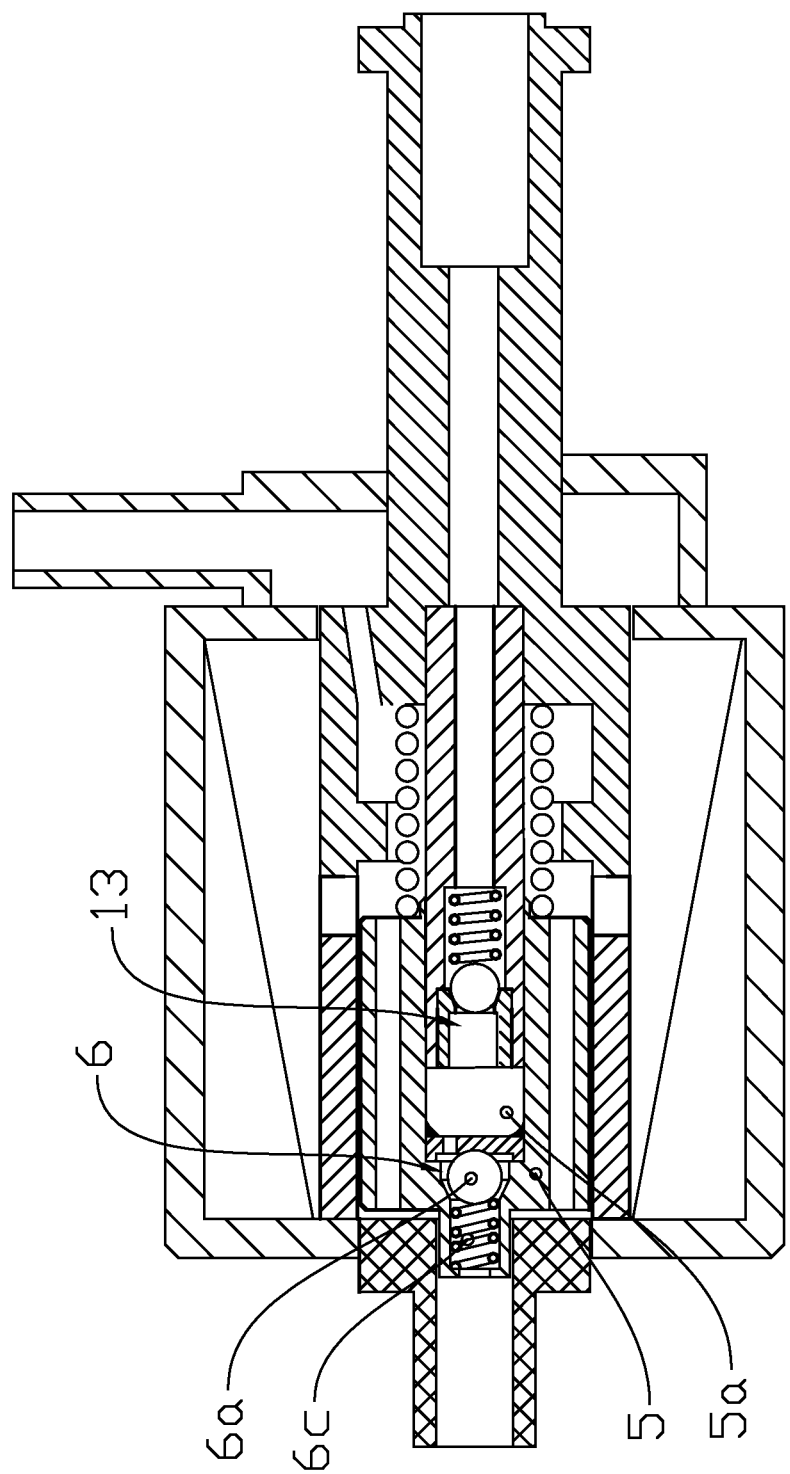
FIG. 6 is a structural representation of the sixth embodiment of the constant-volume metering pump provided in the present invention.

FIG. 6 is the structural representation of the sixth embodiment of the constant-volume metering pump provided in the present invention. The difference between the schematic diagram of this embodiment and the structure shown for the fifth embodiment is that, the inlet valve limiting piece 6*c* is fixed on the inner sleeve bore 5*a*, including an inlet valve spring 6*c*, which functions between the inlet valve piece 6*a* and the sleeve 5. In this way, the inlet valve 6 will be normally open without external force. During the return stroke of the armature 3, the liquid enters the pressure feed space 13 through the liquid inlet valve 6; and during the pressure feed stroke of the armature 3, the liquid inlet valve 6 is closed relying on the pressure rise in the pressure feed space 13.

Figure 7:
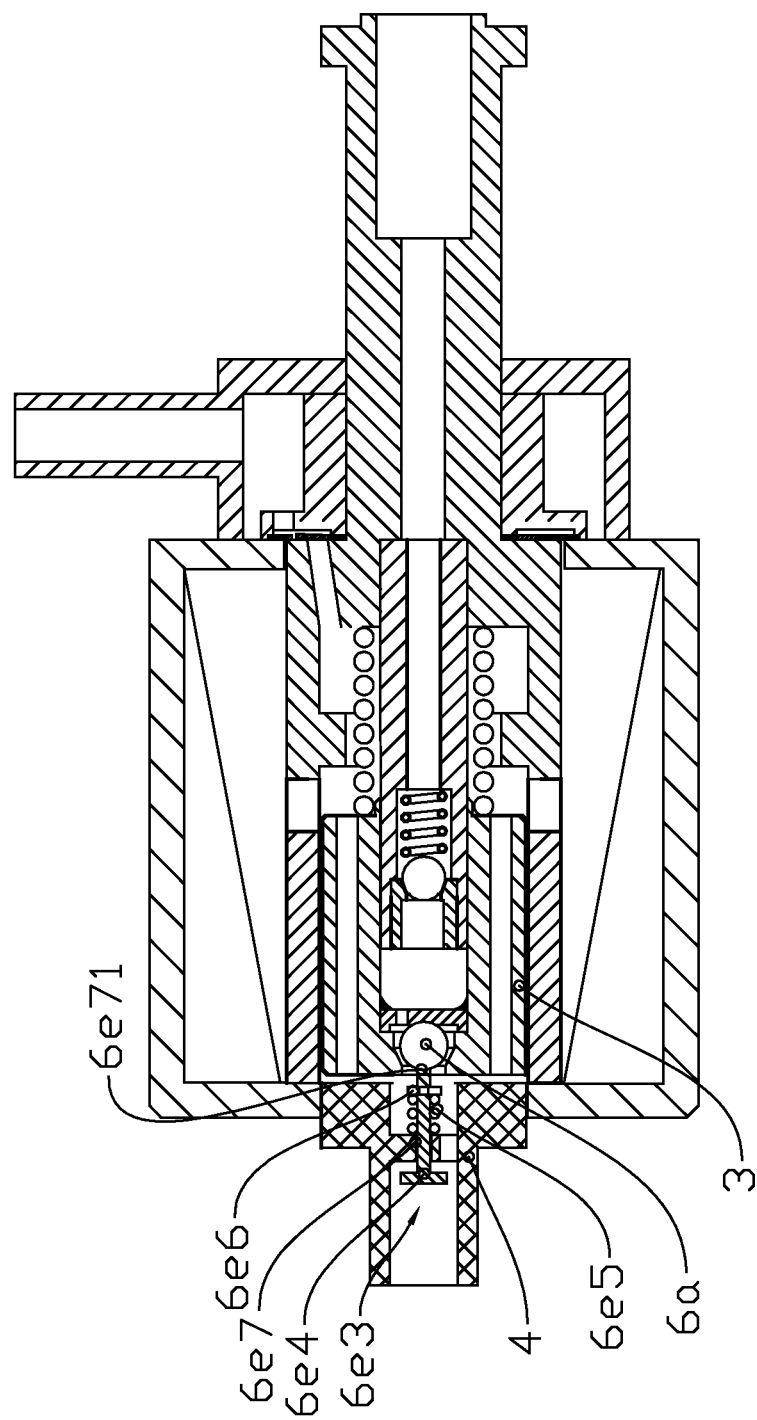
FIG. 7 is a structural representation of the seventh embodiment of the constant-volume metering pump provided in the present invention.

FIG. 7 is the structural representation of the seventh embodiment of the constant-volume metering pump provided in the present invention. The difference between the schematic diagram of this embodiment and the structure shown for the fifth embodiment is that, this embodiment includes an elastic body 6e3, wherein the elastic body 6e3 includes a slide bar 6e4, a card 6e6 and a support spring 6e5. The card 6e6 is fixed on the slide bar 6e4, and the support spring 6e5 functions between the rear pump end 4 and the card 6e6. The rear pump end 4 includes a slide bar hole 6e7, and the slide bar 6e4 can slide along the slide bar hole 6e7. The slide bar hole 6e7 includes an arc surface 6e71 that acts on the inlet valve piece 6a. When the armature 3 gets close to the rear pump end 4, due to the action of the support spring 6e5, the slide bar 6e4 jacks up the inlet valve piece 6a, so that the inlet valve 6 is in an opening state at the initial stage when the armature 3 begins to move.

Figure 8:
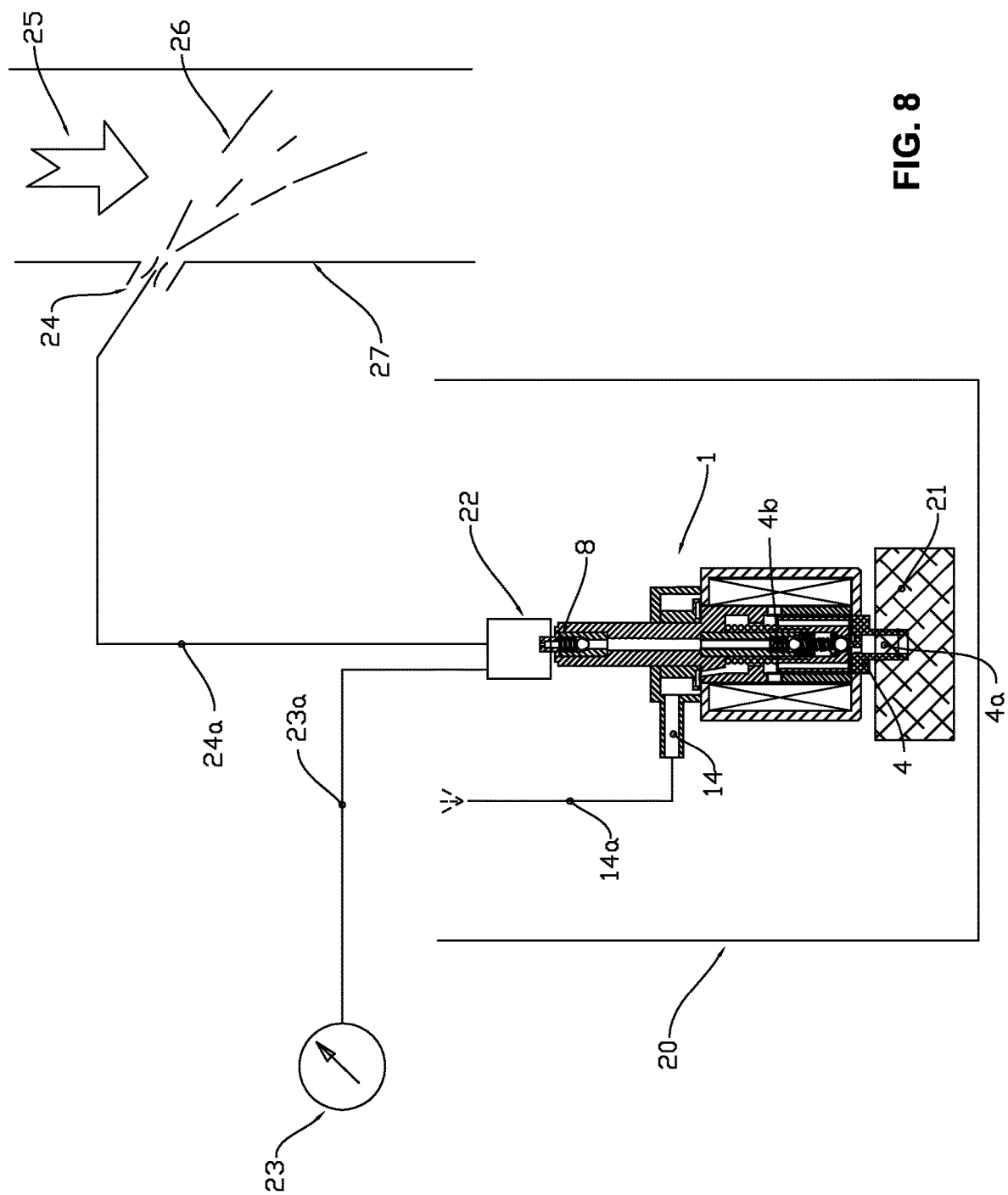
FIG. 8 is a schematic diagram of the application of the engine after-treatment SCR air-assisted injection device provided in the present invention.

FIG. 8 shows the schematic diagram of the application of the engine after-treatment SCR air-assisted injection device provided in the present invention, including a urea tank 20, a constant-volume metering pump 1 including a filter 21 and an exhaust pipe 14a, an air-liquid mix chamber 22, a pneumatic supply 23, and a nozzle 24. The filter 21 is installed at the entrance on the rear pump end 4 of the constant-volume metering pump 1, through which the liquid enters the liquid inlet 4a. The return line 14a is installed at the return passage 14 of the constant-volume metering pump 1, which stretches out to the upper space of the urea tank 20, and whose outlet can connect with another filter unit (not shown in the figure). The constant-volume metering pump 1 is fixed in the urea tank 20 and near to the bottom, and the air-liquid mix chamber 22 respectively connects with the outlet valve 8, the pneumatic supply 23 and the nozzle 24 of the constant-volume metering pump 1. The air-liquid mix chamber 22 can be directly arranged at the outlet valve 8 of the constant-volume metering pump 1, and in the urea tank 20, it can also stretch to the outside of the urea tank together with the outlet valve 8. The pneumatic supply 23 can be an air compressor, such as an air pump of the brake of a car or an air suction booster, or the exhaust gas on the upstream of the exhaust pipe. The nozzle 24 can be installed slantwise on the engine exhaust pipeline 27, forming a sharp angle between the mist 26 and the exhaust gas 25. The nozzle 24 can be a simple orifice or swirl nozzle.

The working process of the engine after-treatment SCR air-assisted injection device is as follows.

Liquid in the urea tank 20 enters and fills the constant-volume metering pump 1 through the filter 21 and the liquid inlet passage 4b due to self weight. The constant-volume metering pump 1, under the action of the driving force of the solenoid, pumps the urea liquid to the outlet valve 8, and injects it into the air-liquid mix chamber 22 through the outlet valve 8. At the same time, the high pressure air output from the pneumatic supply 23 enters the air-liquid mix chamber 22 through the gas transmission pipe 23a. The mixture arrives at the nozzle 24 through the delivery pipe 24a, and is atomized and injected into the engine exhaust pipe through the nozzle 24, and mixed with the exhaust 25. The return liquid and gas produced by the constant-volume metering pump 1 in this process are discharged to the upper part of the urea tank 20 through the liquid return pipeline 14a.

After the after-treatment task is finished, the air source 23 can be closed in delayed time, so as to clean the residual urea liquid in the pipeline, avoiding urea liquid freezing or seeding out.

Figure 9:
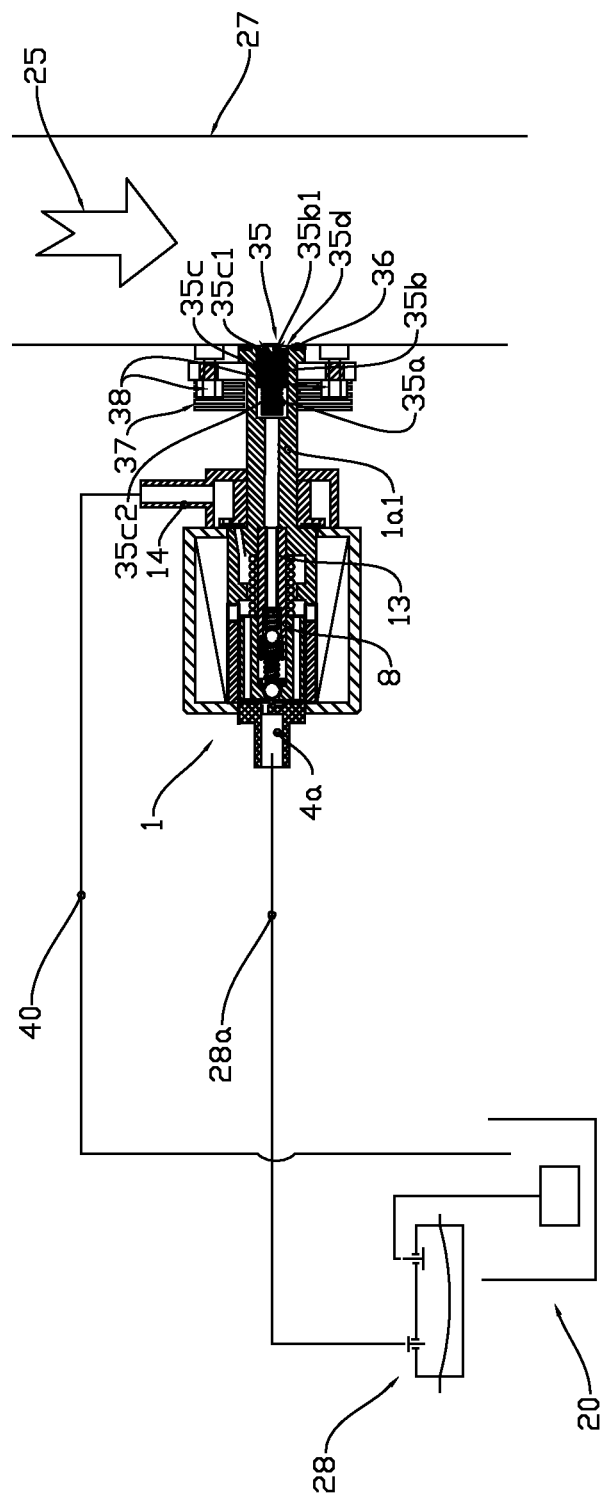
FIG. 9 is one of the schematic diagrams of the applications of the engine after-treatment SCR non-air assisted injection device provided in the present invention.

FIG. 9 is one of the schematic diagrams of the applications of the engine after-treatment SCR non-air assisted injection device provided in the present invention, including a urea tank 20, a low pressure infusion pump 28, a constant-volume metering pump 1 including a liquid return pipe 40, and a nozzle 35 arranged at the output end 1a1 of the constant-volume metering pump 1. The low pressure infusion pump 28 connects with the constant-volume metering pump 1 in series, and the low pressure infusion pump 28 is a diaphragm pump, and the diaphragm pump 28 provides sustained pressure liquid to the constant-volume metering device through the high-pressure pipe 28a. The constant-volume metering pump 1 is placed outside of the urea tank 20, and one end of the liquid return pipe 40 connects with the liquid return port 14 of the constant-volume metering pump 1, and the other end leads to the upper part of the liquid level of the urea tank 20. The nozzle 35 is arranged on the downstream of the outlet valve 8 of the constant-volume metering pump 1, and is a lift valve nozzle relying on pressure to open, including a valve seat 35c, a valve piece 35b, a valve spring 35a and a valve body 35d. The valve piece 35b includes a matching surface 35b1 that can be sealed mutually with the surface 35c1 of the valve seat, and the nozzle 35 is in a closing state under the action of the spring force of the valve spring 35a. The valve body 35d includes a side through-hole 35c2 allowing pressure liquid to enter it. When the liquid pressure rises to the preset opening pressure of the nozzle 35, the valve piece 35b is opened and the liquid is injected thereupon. The annular spout 35d of the lift valve nozzle 35 connects with the engine exhaust pipe 27, and is fixed via the bolt 38, and sealed by the sealing gasket 36. The urea jetting fluid is injected into the engine exhaust pipe 27 through the nozzle 35, and is mixed with the exhaust 25 for tail gas treatment.

Further, the nozzle 35 end includes a cooling unit 37 that is a heat exchanger, such as a cooling fin. It takes the heat of the injector to the atmosphere by way of convection heat exchange and heat radiation, so as to avoid damages to the outlet valve 8 due to high temperature.

Figure 10:
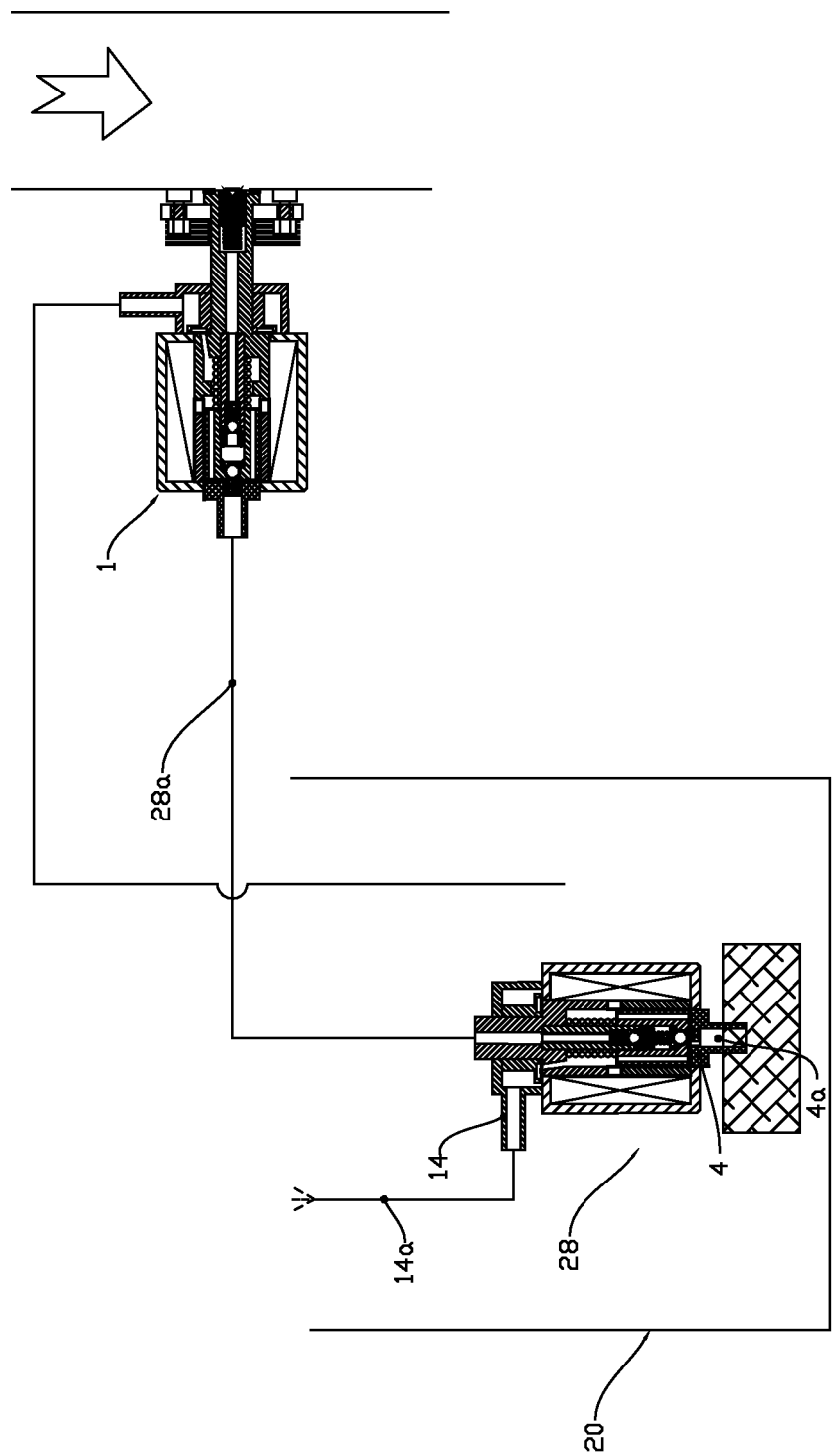
FIG. 10 is the other schematic diagram of the applications of the engine after-treatment SCR non-air assisted injection device provided in the present invention.

FIG. 10 is the second schematic diagram of the applications of the engine after-treatment SCR non-air assisted injection device provided in the present invention. One of the differences between the first application and this application is that, the low pressure infusion pump 28 is a piston pump, which can be placed inside the urea tank 20. The piston pump 28 includes a liquid return passage 14a installed on the return passage 14 and a filter 21 arranged at the rear pump end 4. After being filtered through the filter 21, the liquid enters the piston pump 28. Part of the liquid is output at high pressure, and is transported to the constant-volume metering pump 1 through the high-pressure pipe 28a, and the other part of the liquid and the gas are discharged into the urea tank 20 through the liquid return passage 14a. The above piston pump 28 can be replaced with a constant-volume pump 1, and also can be any non-constant volume piston pump. The former can achieve its liquid supply demand by changing the control strategy, and the latter can include a piston-motion pump or a sleeve-motion pump.

Figure 11:
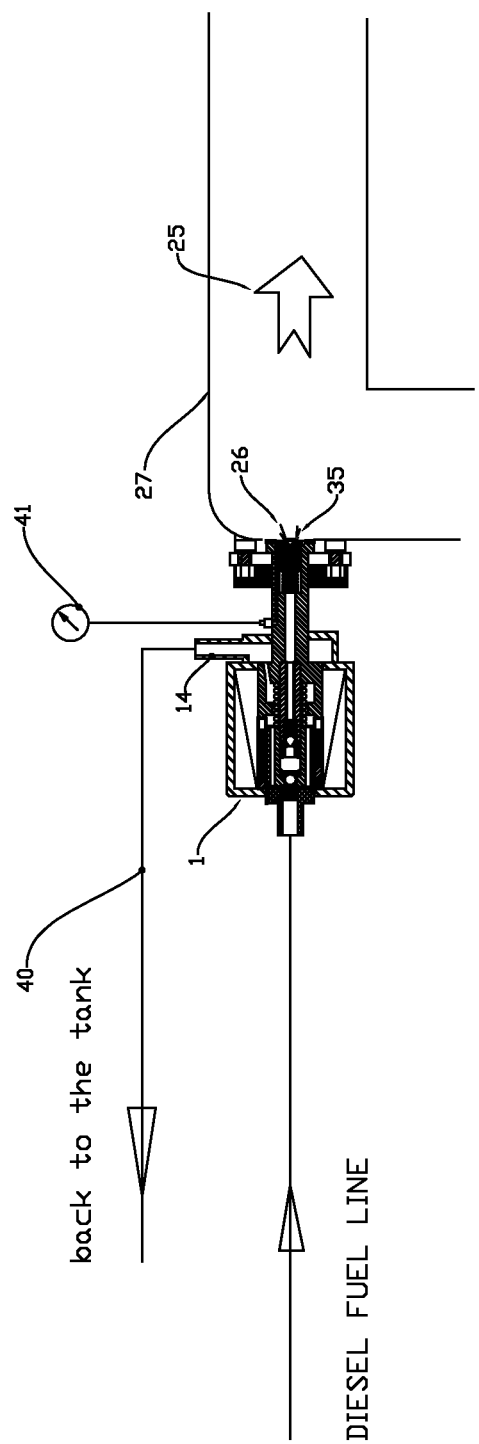
FIG. 11 is a schematic diagram of the application of the engine after-treatment DPF regeneration and injection device provided in the present invention.

FIG. 11 is a schematic diagram of the application of the engine after-treatment DPF regeneration and injection device provided in the present invention. The constant-volume metering pump 1 includes a nozzle 35 arranged at the output end, and a liquid return passage 40 connecting with the return passage 14, and the other end of the liquid return passage 40 connects with the oil return tank (not shown in the figure). The nozzle 35 is a lift valve 35 relying on pressure to open, which is installed on the exhaust duct 27 in a way beneficial to mix the jetting fluid 26 with the exhaust gas 25. The regenerative fuel enters the constant-volume metering pump 1 from its liquid inlet 4a, and is pumped to the lift valve nozzle 35 through the pressure feed space 13, atomized and injected through the nozzle 35. The jetting fluid 26 mixes with the exhaust gas 25 for exhaust-gas disposal. In this process, the return liquid produced by the constant-volume metering pump 1 and the gas are discharged into the oil storage tank (not shown in the figure) through the liquid return passage 40. The DPF is located at a relatively hot section of the exhaust pipe, so the compressed air 41 of the engine supercharger can be introduced to cool down the nozzle 35.

The fuel oil of the above DPF regeneration system can be supplied directly from the low pressure fuel feed pump of the engine's high pressure injection system, or extracted from the main fuel tank of the engine using the DPF fuel tank.

For the application of the constant-volume pump 1 listed in applications 8-9, differences in structural details are not differentiated. Any constant-volume pump 1 that meets the basic features described in the present invention falls within the scope of application.

The constant-volume metering pump provided in the present invention and further solutions that come within the spirit of the present invention shall fall within the scope of disclosure and protection of the present invention.

What is claimed is:

1. A constant-volume metering pump, comprising a pump body, and a solenoid device and a piston pump disposed inside the pump body,
    wherein the solenoid device comprises an armature, and the piston pump comprises a sleeve, a piston, an inlet valve and an outlet valve,
    wherein the sleeve comprises an inner sleeve bore, and the inner sleeve bore closely matches the external surface of the piston and can slide freely,
    wherein the piston pump divides an interior of the pump body into a low pressure space and a pressure feed space, such that a liquid enters the pressure feed space from the low pressure space through the inlet valve, and is output through the outlet valve,
    wherein the sleeve connects with the armature and moves with the armature in a synchronous reciprocating motion, the solenoid device drives the sleeve to perform a relative motion to the piston, causing output of the liquid, and an output quantity of the liquid formed by such relative motion is defined by a geometry of the piston pump through armature displacement or decompression, wherein the geometry of the piston pump comprises a front pump end and a rear pump end and the armature moves between the front pump end and the rear pump end, wherein the front pump end is configured to stop armature movement upon contact.

2. The constant-volume metering pump according to claim 1, wherein it comprises a front pump end and a rear pump end relatively fixed to the pump body, and the armature moves between the front pump end and the rear pump end.

3. The constant-volume metering pump according to claim 2, wherein the inlet valve comprises an inlet valve piece and an inlet valve seat, the inlet valve seat is arranged on the other end of the inner sleeve bore opposite to the piston.

4. The constant-volume metering pump according to claim 3, wherein it comprises an inlet valve limiting piece, which is arranged in the inner sleeve bore, the inlet valve piece is limited between the inlet valve seat and the inlet valve limiting piece, and maintains a space where it can move freely.

5. The constant-volume metering pump according to claim 4, wherein the inlet valve limiting piece is fixed on the sleeve, comprising an inlet valve spring which functions between the inlet valve piece and the sleeve.

6. The constant-volume metering pump according to claim 4, wherein the inlet valve limiting piece can move freely in the inner sleeve bore, comprising a limiting piece spring which functions between the piston and the inlet valve limiting piece.

7. The constant-volume metering pump according to claim 6, wherein it comprises a support relatively fixed to the pump body, and when the armature gets close to the rear pump end, the support defines the displacement of the inlet valve piece towards the direction of the rear pump end.

8. The constant-volume metering pump according to claim 4, wherein the inlet valve limiting piece is fixed on the sleeve, comprising a elastic body connected with the pump body, when the armature gets close to the rear pump end, the elastic body functions between the inlet valve piece and the pump body.

9. The constant-volume metering pump according to claim 3, wherein it comprises an inlet valve spring functioning between the piston and the inlet valve piece.

10. The constant-volume metering pump according to claim 2, wherein the inlet valve is a slide valve formed by the coordination of the piston and the sleeve, the sleeve comprises a suction passage connecting with the inner sleeve bore and the low pressure space, and the suction passage is opened or closed due to the relative motion between the sleeve and the piston, thus forming the slide valve.

11. The constant-volume metering pump according to claim 2, wherein the inlet valve is a slide valve formed by the coordination of the piston and the sleeve, the piston comprises a suction passage connecting with the piston center bore and the low pressure space, and the suction passage is opened or closed due to the relative motion between the sleeve and the piston, thus forming the slide valve.

12. The constant-volume metering pump according to claim 1, wherein a sleeve comprises a discharge hole for limiting the output quantity of liquid.

13. An engine after-treatment DPF regeneration and injection device, comprising a constant-volume metering pump claimed in claim 1, a nozzle connecting with the outlet valve, and fuels for regeneration are injected into the engine exhaust pipe through the nozzle.

14. The engine after-treatment DPF regeneration and injection device according to claim 13, wherein the nozzle is a lift valve that is opened relying on the pressure.

15. The engine after-treatment DPF regeneration and injection device according to claim 14, wherein it comprises an air flow passage connecting with the constant-volume metering pump and the engine intake tube which introduces part of the engine air intake into the constant-volume metering pump for cooling down the pump body and the nozzle.

16. An engine after-treatment SCR air-assisted injection device, comprising a constant-volume metering pump claimed in claim 1, wherein it further comprises an air-liquid mix chamber, and a mixing nozzle connecting with the engine exhaust pipe, the air-liquid mix chamber connects with the output end of the constant-volume metering pump, and the air-liquid mix chamber connects with a compressed air source, the reducing agent of the SCR is injected into the air-liquid mix chamber through the outlet valve of the constant-volume metering pump, and is mixed with the compressed air inside the chamber, and then injected into the engine exhaust pipe through the mixing nozzle.

17. An engine after-treatment SCR air-assisted injection device, comprising a constant-volume metering pump claimed in claim 1, wherein it further comprises a liquid nozzle connecting with the output end of the constant-volume metering pump, and a low pressure infusion pump, the low pressure infusion pump connects with the constant-volume metering pump in series, and the liquid nozzle is a lift valve-type nozzle that is opened relying on the pressure, which injects the reducing agent of the SCR into the engine exhaust pipe.

18. The engine after-treatment SCR air-assisted injection device according to claim 17, wherein the low-pressure infusion pump is a diaphragm pump.

19. The engine after-treatment SCR air-assisted injection device according to claim 17, wherein the low-pressure infusion pump is a piston pump.

20. The engine after-treatment SCR air-assisted injection device according to claim 19, wherein the piston pump can be arranged at a position near to the bottom in the SCR reducing agent storage box.

* * * * *